United States Patent [19]

Jow et al.

[11] Patent Number: 4,499,793
[45] Date of Patent: Feb. 19, 1985

[54] AUTOMATIC GEAR SHIFTING DEVICE

[75] Inventors: Long S. Jow; Long J. Jow, both of Taipei, Taiwan

[73] Assignee: Transtech Industrial Corporation, Taipei, Taiwan

[21] Appl. No.: 318,210

[22] Filed: Nov. 4, 1981

[51] Int. Cl.³ .................... B60K 41/18; B60K 41/04
[52] U.S. Cl. ........................ 74/866; 74/864; 74/862; 74/859; 74/860; 74/858
[58] Field of Search ............... 74/866, 862, 863, 864, 74/859, 860, 858; 364/424.1

[56] References Cited

U.S. PATENT DOCUMENTS

| 3,335,830 | 8/1967 | De Castelet | 74/858 |
| 4,168,638 | 9/1979 | Usui | 74/866 |
| 4,324,322 | 4/1982 | Sibend | 74/866 |

FOREIGN PATENT DOCUMENTS

| 1954783 | 5/1970 | Fed. Rep. of Germany | 74/866 |
| 2014052 | 11/1970 | Fed. Rep. of Germany | 74/866 |
| 2036732 | 2/1972 | Fed. Rep. of Germany | 74/866 |
| 2065369 | 6/1973 | Fed. Rep. of Germany | 74/866 |
| 2,714,559 | 10/1978 | Fed. Rep. of Germany | 74/866 |
| 0072822 | 6/1979 | Japan | 74/866 |
| 0076244 | 6/1980 | Japan | 74/866 |
| 2018917 | 10/1979 | United Kingdom | 74/858 |
| 2051979 | 1/1981 | United Kingdom | 74/866 |
| 2069075 | 8/1981 | United Kingdom | 74/866 |

Primary Examiner—Allan D. Herrmann
Assistant Examiner—D. Wright
Attorney, Agent, or Firm—Shoemaker and Mattare, Ltd.

[57] ABSTRACT

An automatic gear shifting device for operating a gearshift type transmission in conjunction with a disc type clutch of an automobile, comprising: a control unit; a trigger switch operable by the accelerator pedal of the automobile; detectors for detecting engine speed, automobile road speed, transmission position (gear position) and clutch position and for delivering control signals to the control unit; actuators operable by vacuum produced in the intake manifold of the engine or by a pressurized air or fluid to operate the clutch and the transmission, the actuators each having a solenoid valve through which the vacuum or the pressurized air is applied to the actuator; the control unit, upon receiving and processing the control signals, being adapted to deliver operation signals to the solenoid valves to allow vacuum or pressurized air or fluid to be applied to the actuators in a pre-programmed sequential order to operate automatically the transmission and clutch to adjust to the speed and load condition of the automobile. The device of this invention further comprises a mode selection switch for selectively changing the function of the device from automatic operation to manual operation, so that the transmission may be manually operated if so desired.

9 Claims, 14 Drawing Figures 4,499,793

AUTOMATIC GEAR SHIFTING DEVICE

BACKGROUND OF THE INVENTION

There are generally two types of automobile transmissions for changing the ratio (hereafter called gear ratio) of power flow from the engine to the drive axle. One is the manually operated gear-shift type which is used with a disc type clutch, and the other is the automatic type provided with a hydraulic torque converter and a planetary gear system. Both types of transmission have been conventionally used but each has its distinct disadvantages. Conventional manual transmissions require a certain level of skill to be operated efficiently and conventional automatic transmissions are energy consuming, bulky and expensive to manufacture.

In view of the aforesaid disadvantages of conventional automobile transmissions, the present invention offers a novel automatic gear shifting device for operating a gear-shift type transmission in conjunction with a disc type clutch for an automobile, in which the gear-shifting operation may be selectively operated automatically or manually and in which less energy is consumed and the cost of manufacture is less than conventional automatic transmissions.

SUMMARY OF THE INVENTION

This invention discloses an automatic gear shifting device for operating a gear-shift type transmission in conjunction with a disc type clutch of an automobile, comprising a control unit; a trigger switch operable by the accelerator pedal of the automobile; detectors for detecting engine speed, automobile road speed, transmission gear position and clutch position and for delivering control signals to the control unit; actuators operable by vacuum produced in the intake manifold of the engine or by a pressurized air or fluid to operate the clutch and the transmission, the actuators each having a solenoid valve through which the vacuum or the pressurized air or fluid is applied to the actuators; a control unit, upon receiving and processing the control signals, being adapted to deliver operation signals to the solenoid valves to allow vacuum or pressurized air or fluid to be applied to the actuators in a pre-programmed sequential order to operate automatically the transmission and clutch to adjust to the speed and load condition of the automobile. The device of this invention further comprises a mode selection switch for selectively changing the function of the device from automatic to manual operation so that the transmission may be manually operated if so desired.

DETAILED DESCRIPTION OF THE INVENTION

Figure 1:
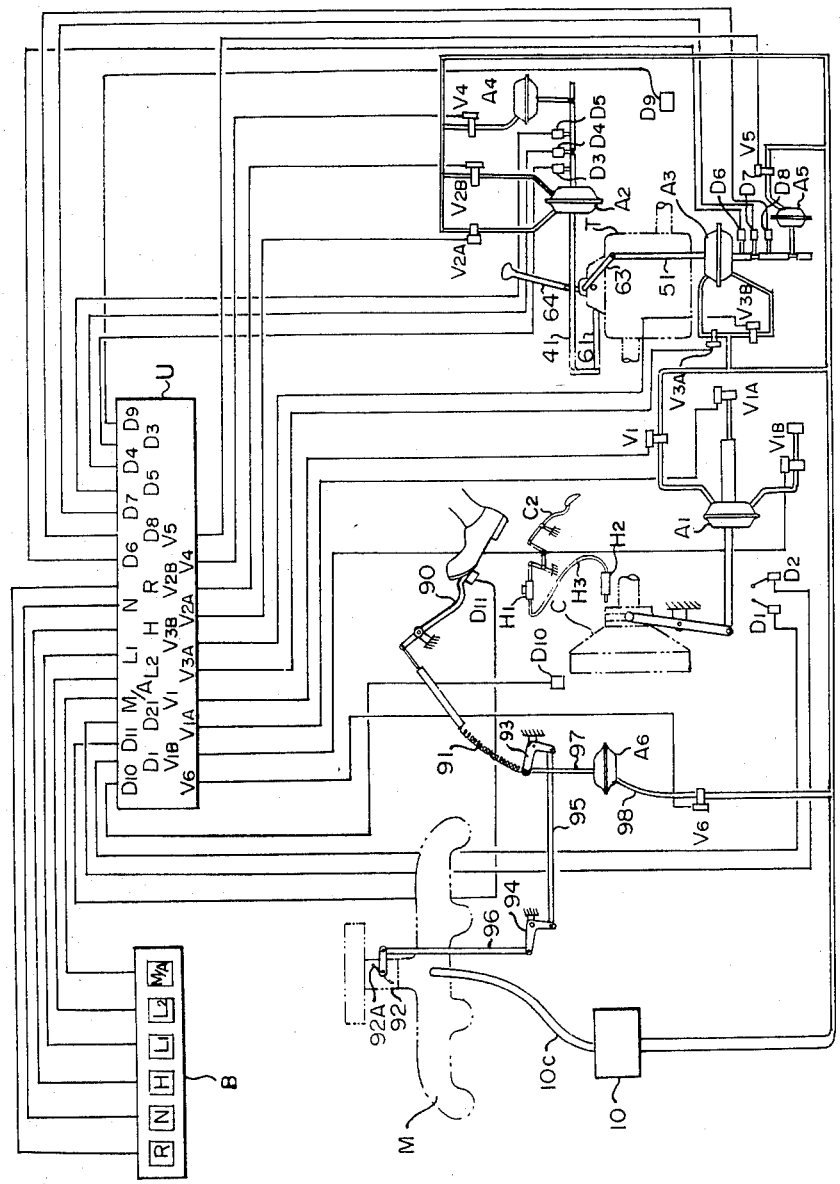
FIG. 1 is a schematic diagram of an embodiment of the automatic gear shifting device of this invention, showing the general arrangement of its component memebers.
Figure 2:
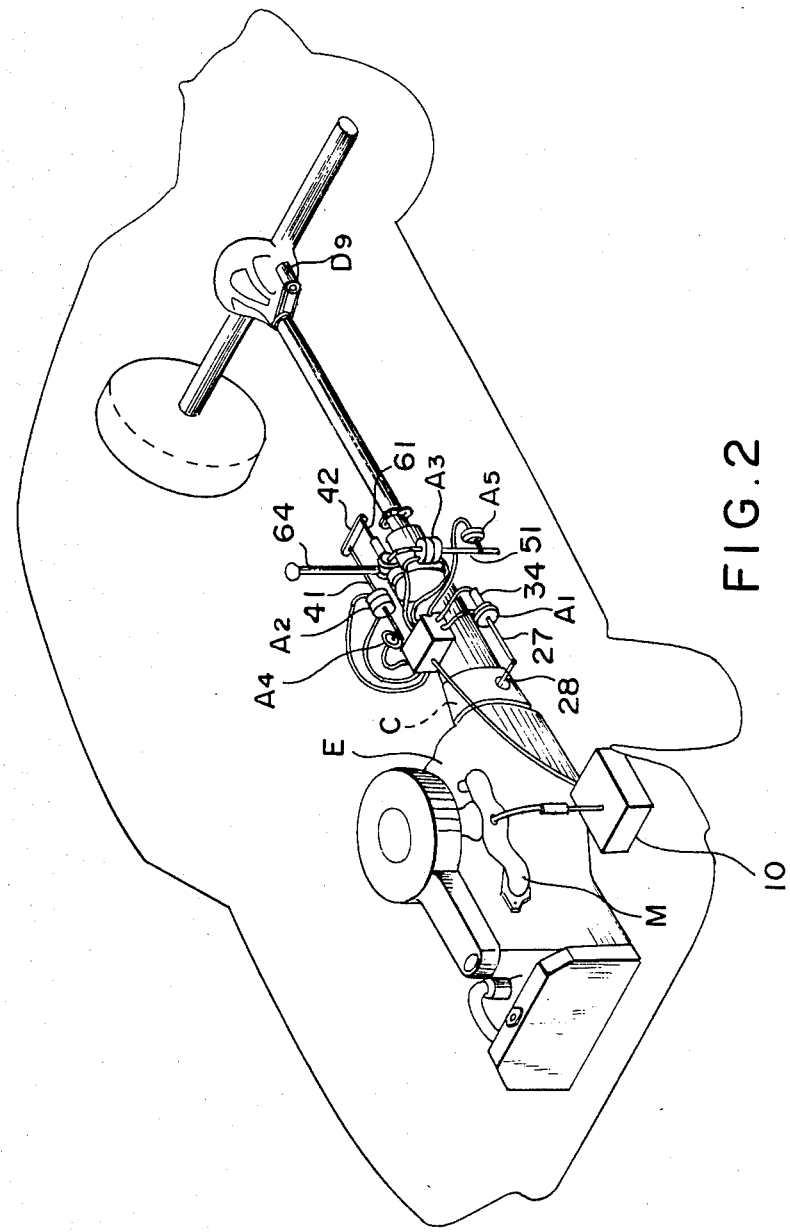
FIG. 2 is a schematic, oblique perspective view of the embodiment shown in FIG. 1, showing the spacial arrangement of the actuators.

As shown in FIG. 1, the automatic gear shifting device of this invention comprises a disc clutch generally designated by C; a first actuator A1; a gear-shift type transmission generally designated by T having a shift-lever 64; shift rod 61 operable by shift lever 64 and also by second actuator A2 having push rod 41; a shift arm 63 operable by shift lever 64 and also by third actuator A3 having push rod 51; fourth actuator A4 adapted to hold push rod 41 and shift rod 61 in a neutral position; fifth actuator A5 adapted to hold push rod 51 and shift arm 63 in a neutral position; sixth actuator A6 adapted to operate throttle valve 92A of carburator 92; first and second detectors D1 and D2 for detecting the position of clutch C; third, fourth and fifth detectors D3, D4 and D5 for detecting the positions of shift rod 61; sixth, seventh and eighth detectors D6, D7 and D8 for detecting the positions of shift arm 63; ninth detector D9 for detecting the road speed of the automobile; tenth detector D10 for detecting engine speed; and trigger switch D11 operable by accelerator pedal 90.

Figure 10:
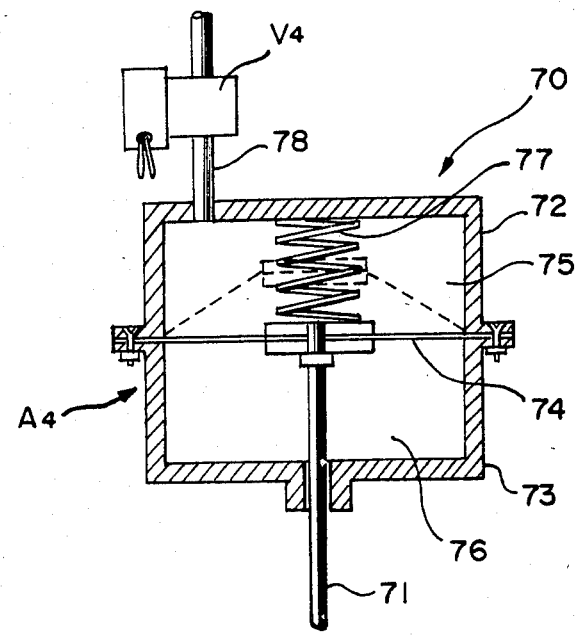
FIG. 10 is a cross-sectional view of a single-acting type actuator employed in the device of this invention.

First actuator A1 is of a single-acting type shown in FIG. 3 to be described later. Fourth, fifth and sixth actuators A4, A5 and A6 are of another single-acting type, whose typical construction is illustrated in FIG. 10 taking fourth actuator A4 as an example, each having a diaphragm therein to form an acting chamber at one side of the diaphragm to be communicated with a vacuum reservoir 10 with appropriate conduits provided with solenoid-operated valves namely, first, fourth, fifth and sixth solenoid valves V1, V4, V5 and V6, respectively. Vacuum reservoir 10 communicates with intake manifold M of the engine with appropriate conduit 10C, so as to maintain a vacuum in vacuum reservoir 10 when the engine is running.

Figure 9:
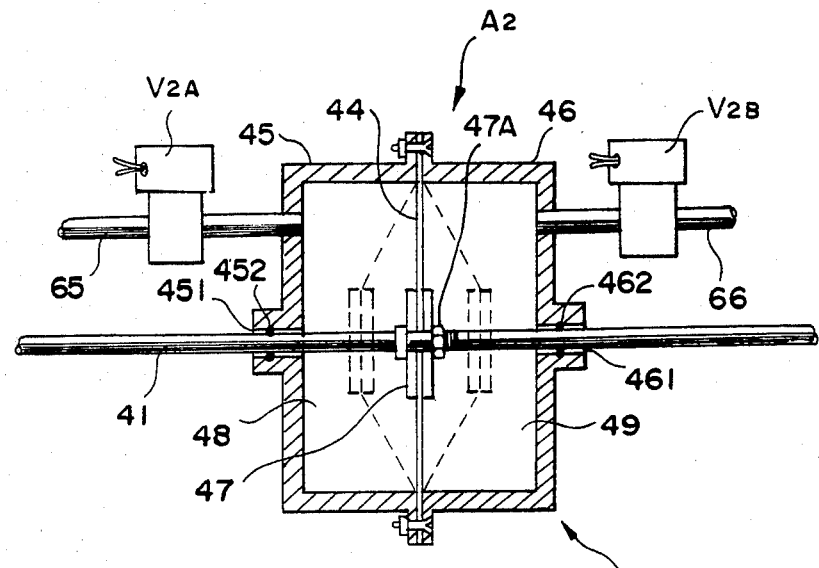
FIG. 9 is a cross-sectional view of a double-acting type actuator employed in the device of this invention.

Second and third actuators A2 and A3 are of the double-acting type, whose typical construction is illustrated in FIG. 9 taking second actuator A2 as an example, each having a diaphragm therein to form two acting chambers, one at each side of the diaphragm, to communicate with vacuum reservoir 10 with appropriate conduits having second A, second B, third A and third B solenoid valves V2A, V2B, V3A and V3B, respectively.

Figure 7:
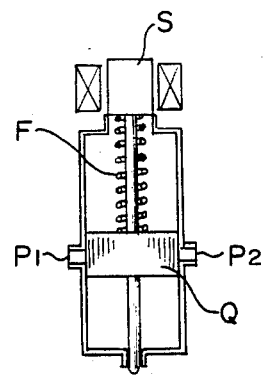
FIG. 7 is a schematic, cross-sectional view of a two-way solenoid valve employed in the device of this invention.
Figure 8:
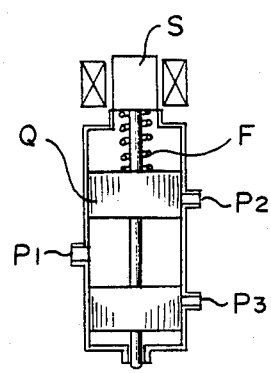
FIG. 8 is a schematic, cross-sectional view of a three-way solenoid valve employed in the device of this invention.

Solenoid valves V1, V1A and V1B are of the two-way type as shown in FIG. 7, each having a solenoid S, plunger Q operable by solenoid S, first port P1 and second port P2, spring F to urge plunger Q in a position to close a passage communicating first and second ports P1 and P2. When solenoid S is energized, it pulls plunger Q to open the passage and when solenoid S is de-energized, plunger Q is pushed back by spring F to close the passage.

Solenoid valves V3A, V3B, V3A, V3B, V4, V5 and V6 are each of the three-way type as shown in the drawing; S is a solenoid, Q is a plunger, P1 is a port connected to the acting chamber of the actuator, P2 is a port connected to vacuum reservoir 10, P3 is a port communicating with atmosphere and F is spring. Ports P1 and P2 communicate when solenoid S is energized to pull plunger Q upwards, thus allowing the acting chamber to be connected to vacuum through ports P1 and P2. Port P2 is closed and ports P1 and P3 communicate when solenoid S is de-energized to allow plunger Q to move downwards by the force of spring F, thus allowing atmosphere to be admitted into the acting chamber through ports P3 and P1 to break the vacuum.

The device of this invention is further provided with control unit U to which first through tenth detectors and the trigger switch are electrically connected for delivering relevant control signals to the control unit when respective members move, while the solenoid valves are also electrically connected to the control unit so as to receive relevant operation signals from the control unit for operating respective solenoid valves to allow the vacuum to act on respective actuators to perform the designated operations.

The operational principle and the general arrangement of the device of this invention has been outlined above. The details of each component will now be described as follows.

Figure 3:
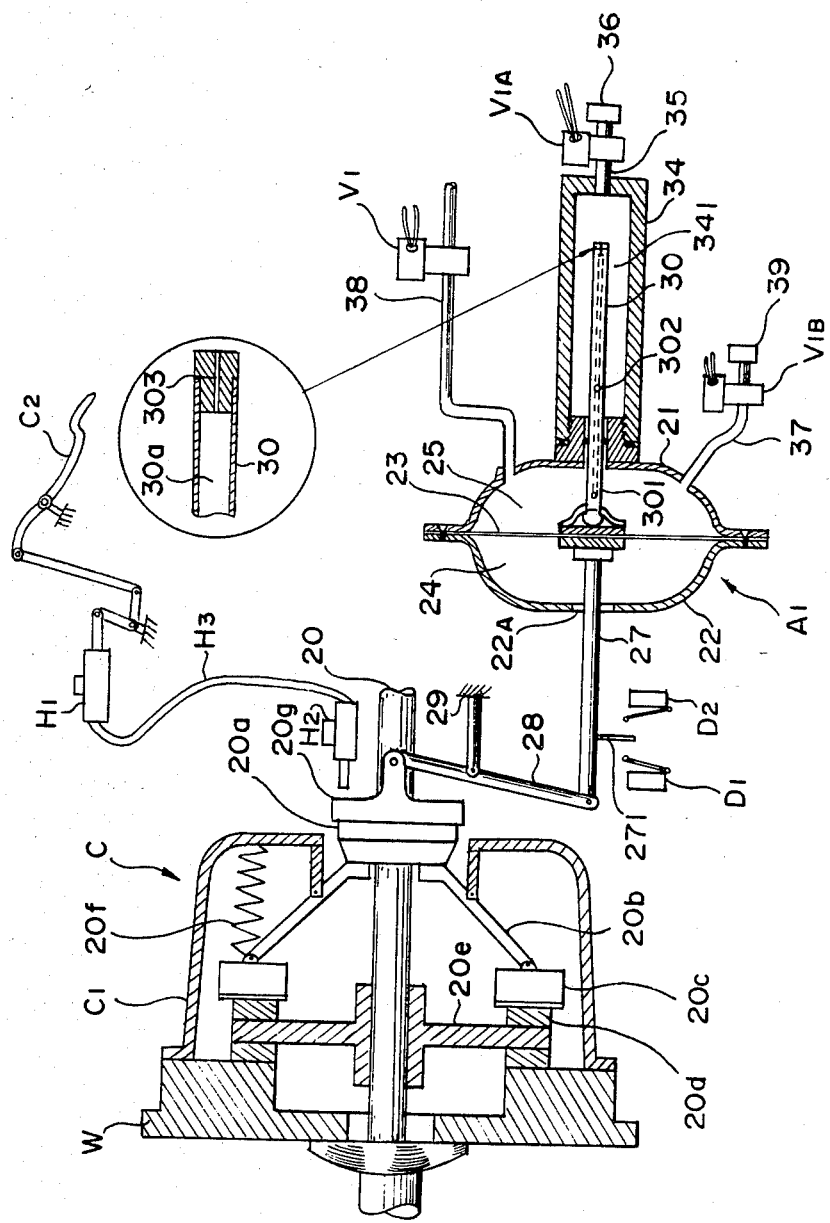
FIG. 3 is a cross-sectional view of the first actuator for operating the clutch, according to the device of this invention.

FIG. 3 shows the general arrangement and construction of the first actuator A1 in connection with disc clutch assembly C. In the drawing, W is a flywheel transmitting the output of the engine; C1 is a clutch housing mounted on flywheel W; 20 is a drive shaft having one end rotatably supported by flywheel W, and the other end operatively connected to an input shaft, not shown, of transmission T, not shown; 20e is a clutch plate or driven plate splined onto drive shaft 20; 20C is a pressure plate; 20a is a release bearing rotatably and slidably mounted on drive shaft 20; 20b are release levers pivotally supported by clutch housing C1 each having one end pivotally connected to pressure plate 20C and the other end disposed in abutment with an inner surface of release bearing 20a. 20f are clutch springs for urging pressure plate 20C and clutch plate 20e against flywheel W. Release bearing 20a is provided with a release collar 20g operatively connected to first actuator A1, 20d is a lining.

First actuator A1 comprises first half casing 21 joined with second half casing 22, diaphragm 23 fixedly disposed between first and second half casings 21 and 22 to form acting chamber 25 and free chamber 24, acting chamber 25 being sealed airtight and communicating with vacuum reservoir 10, not shown, with vacuum tube 38 provided with first solenoid valve V1; and free chamber 24 communicating with atmosphere through central opening 22A. Diaphragm 23 is provided with a push rod 27 having an inner end fixedly mounted on the free chamber side thereof and an outer end extending outwardly through central opening 22A, the outer end being operatively connected to release collar 20g with a clutch lever 28 which is pivotally supported by a frame structure 29. On the acting chamber side of diaphragm 23 there is provided a hollow rod 30 having an inner end fixedly connected to diaphram 23 and an outer end extending through first half casing 21 into a restricting device 34 having an inner end fixed to first half casing 21 and an outer end provided with a vent tube 35 having first auxiliary solenoid valve V1A. The outer end of hollow rod 30 is provided with an orifice 303 as shown in the inset of the drawing and extending into interior chamber 341 of restricting device 34. Hollow rod 30 is provided with a hollow interior 30a having first opening 301 at the inner end thereof, and second opening 302 at a suitable place.

First half casing 21 is further provided with a vent tube 37 having second auxiliary solenoid valve V1B. First and second auxiliary solenoid valves V1A and V1B are respectively provided with air filters 36 and 39.

When first solenoid valve V1 is energized, acting chamber 25 is open to vacuum and diaphragm 23 is pulled toward first half casing 21, thus causing push rod 27 to move in the same direction, and consequently clutch lever 28 is pivoted to push inwards release bearing 20a to disengage clutch plate 20e from the flywheel W. As soon as first solenoid valve V1 is de-energized, acting chamber 25 is isolated from the vacuum source as first solenoid valve V1 is of the two way type which only performs opening and closing of the passage of vacuum tube 38 and no atmosphere will be introduced into acting chamber 25 when the passage is closed. At this moment, first auxiliary valve V1A is energized to admit air into its interior 341, thus allowing air to be drawn into acting chamber 25 through orifice 303, second opening 302, hollow interior 30a and first opening 301 and allowing clutch plate 20e to be engaged with flywheel W by the force of clutch spring 20f.

Second opening 302 is so disposed to be closed by the inner end portion of throttle device 34 as soon as hollow rod 30 moves inwards, thus causing the admitted air to flow through orifice 303 only, which restricts the flow of air and slows down the engagement process of the clutch, so that an abrupt engagement of the clutch may be avoided.

Secondary auxiliary solenoid valve V1B is adapted to admit air to acting chamber 25 whenever a quick engagement of the clutch is necessary.

Push rod 27 is provided with dog 271, and first and second detectors D1 and D2. First detector D1 which may be a micro-switch is activated by dog 271 when push rod 27 is moved outwardly to engage the clutch. Second detector D2, which may also be a micro-switch, is activated by dog 271 when push rod 27 is moved inwardly to disengage the clutch.

In the preferred embodiment clutch C is provided with a conventional clutch pedal C2 adapted to operate a hydraulic system having hydraulic cylinders H1 and H2, and a tube communicating hydraulic cylinders H1 and H2, for pushing release collar 20g, so that the clutch may be disengaged by depressing clutch pedal C2 independent from first actuator A1, if one wishes to operate the device manually.

Figure 4:
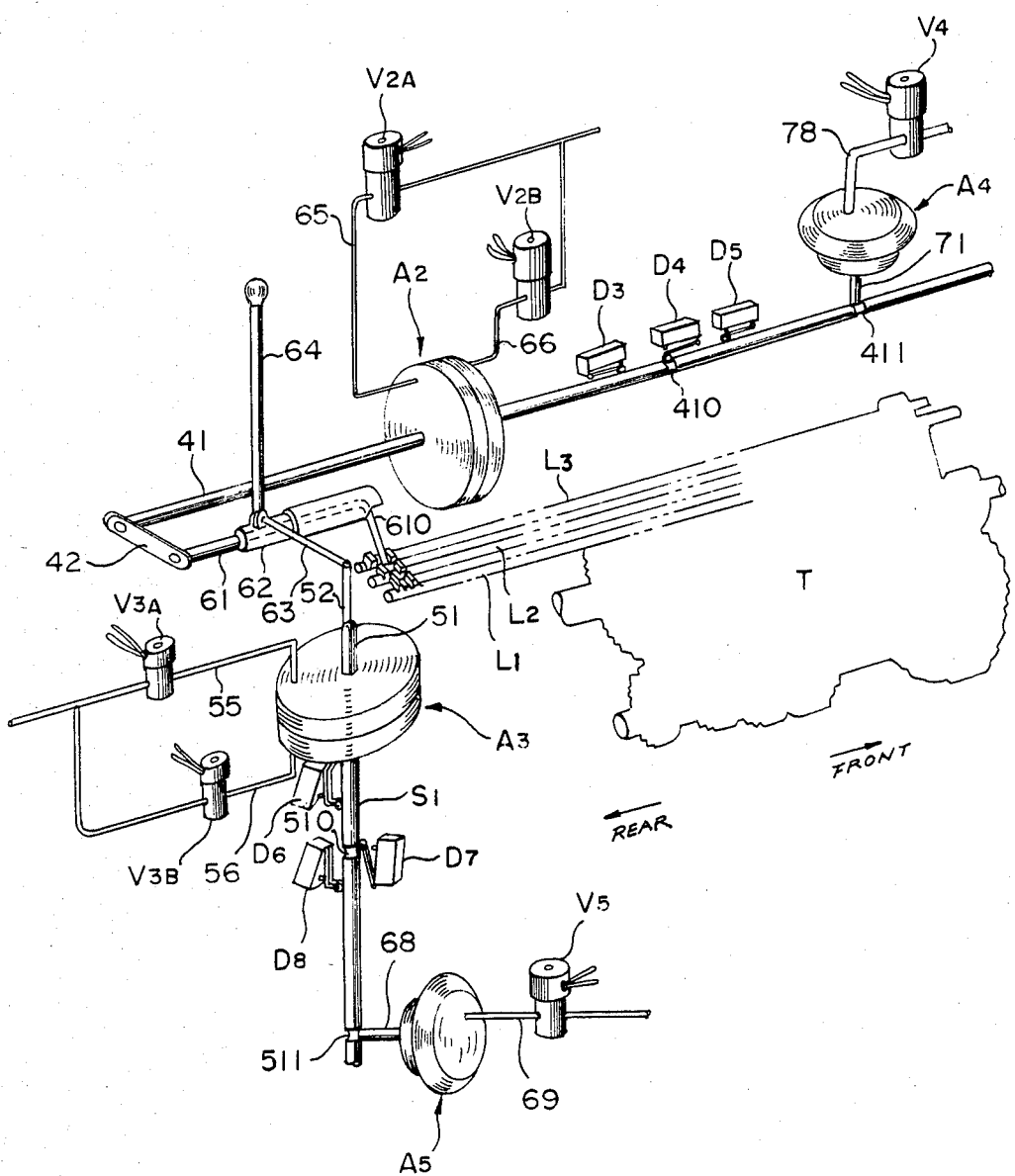
FIG. 4 is an oblique, perspective view of the second, third, fourth and fifth actuators for operating the gear-shift mechanism, showing their arrangement with respect to the gear-shift mechanism.
Figure 11:
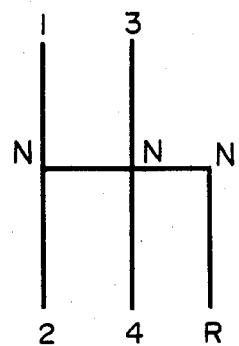
FIG. 11 is a diagram showing the transmission gear positions of the embodiment of FIGS. 1 and 4.

Referring now to FIG. 4, in which is shown the arrangement of the actuators and related detectors for operating the transmission which is generally designated by T, and is a gear-shift type transmission, having four forward speeds and one reverse position as shown in FIG. 11, by way of example. Transmission T is provided with first shift bar L1, second shift bar L2 and third shift bar L3 each capable of moving longitudinally to perform the gear shifting to change the gear ratio, or speed, each shift bar having front, neutral, and rear positions with respective gear ratio, or speed, designated as follows:

| Shift bar | front position | neutral position | rear position |
| --- | --- | --- | --- |
| L1 | 2nd speed | neutral | 1st speed |
| L2 | 4th speed | neutral | 3rd speed |
| L3 | reverse | neutral | not used |

It is to be understood that the above designation of speeds with respect to shift bar positions is for illustration purposes only and is not to limit the scope of this invention as the designation can be changed without affecting the principle and the construction of the device of this invention.

Each shift bar is provided with a fork-like portion to be selectively engaged with a shift finger 610 provided on shift rod 61, which is operable by shift lever 64 and also by second actuator A2 having a push rod 41 connected to shift rod 61 with connecting plate 42, shift rod 61 being capable of rotating with respect to connecting plate 42. Shift lever 64 is also connected to shift arm 63 operable by third actuator A3 having a push rod 51 connected thereto with connecting link 52.

Figure 6:
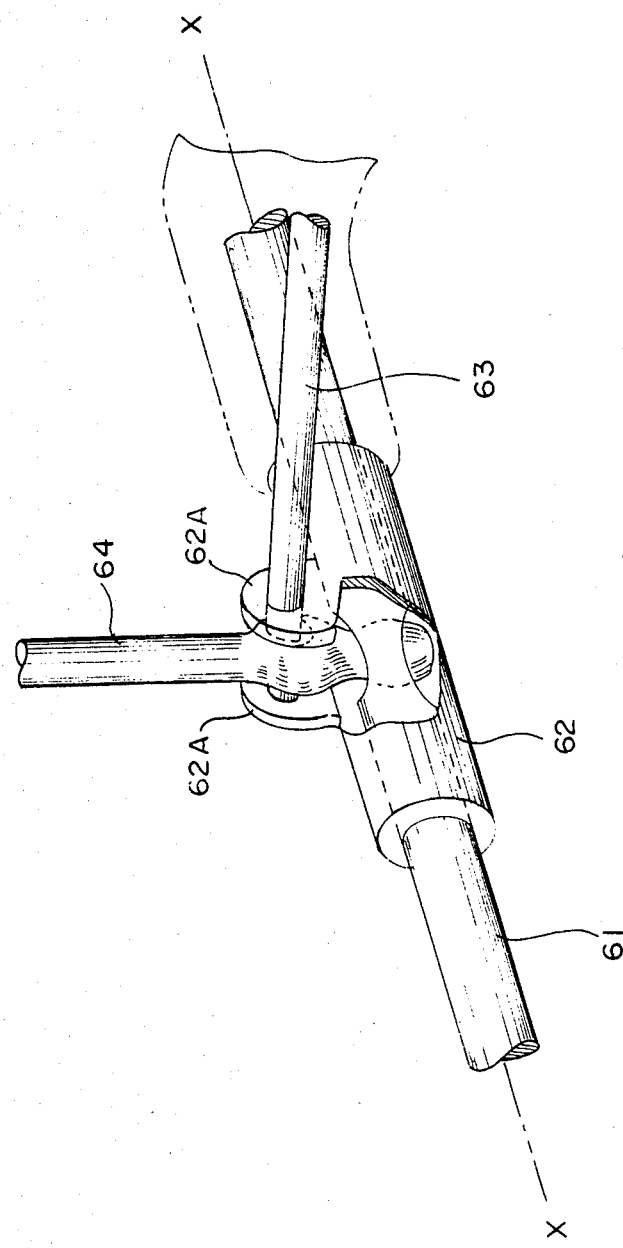
FIG. 6 is a fragmentary, oblique, perspective drawing showing the connection of the shift lever, shift rod and shift arm for operating the transmission.

FIG. 6 shows the detail of the connection of shift lever 64 with shift rod 61 and with shift arm 63. As shown in the drawing shift lever 64 is pivotally supported by one end of shift arm 63 which is rotatably supported by a pair of brackets 62A integrally formed with sleeve 62 in which shift rod 61 is slidably inserted. Sleeve 62 having opening 61A into which a lower extension of shift lever 64 extends, so that shift rod 61 is moved longitudinally when shift lever 64 is moved to pivot with respect to the end of shift arm 63 on which shift lever 64 is pivotally supported, or when second actuator A2 is actuated and push rod 41 is moved longitudinally. Sleeve 62 is rotatably supported by a frame structure, not shown, so that shift rod 61 and sleeve 62 can be rotated with respect to their own center axis X—X by moving shift lever 64 laterally to pivot with respect to center axis X—X. In other words, shift rod 61 is rotated when third actuator A3 is actuated and push rod 51 is moved vertically.

The construction of second actuator A2 is shown in FIG. 9 to be described below. Third actuator A3 is identical with second actuator A2.

As shown in FIG. 9, second actuator A2 comprises first half casing 45 joined with second half casing 46; a diaphragm 44 disposed therebetween to form first acting chamber 48 and second acting chamber 49; push rod 41 extending through both half casings 45, 46 and diaphragm 44; push rod 41 being fixed onto diaphragm 44 with washers 47 and nut 47A, and also slidably supported by first and second half casings 45 and 46 having seals 452 and 462 provided to ensure the airtightness of first and second acting chambers 48 and 49.

First and second acting chambers 48 and 49 respectively communicate with vacuum reservoir 10, not shown, with vacuum tubes 65, 66 respectively provided with second A and second B solenoid valves V2A, V2B which are also shown in FIG. 4.

Similarly, third actuator A3 (FIG. 4) is provided with first and second acting chamber respectively communicating with vacuum reservoir 10, (shown in FIG. 1) with vacuum tubes 55, 56 respectively provided with third A and third B solenoid valves V3A, V3B as shown in FIG. 4.

Figure 5:
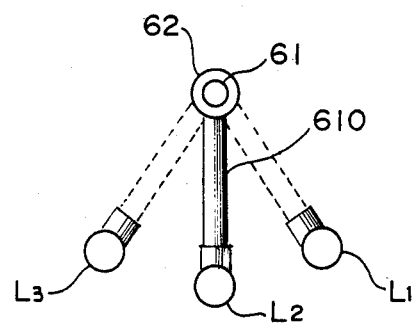
FIG. 5 is a schematic end view of the shift rod and shift bars of the transmission employed in the device of this invention.

As shown in FIG. 4 shift rod 61 is provided with shift finger 610 capable of selectively engaging with the fork-like portions of first, second and third shift bars L1, L2 and L3. The selection of engagement of shift finger 610 with the fork-like portions of the shift bars is performed by rotating shift rod 61, as shown in FIG. 5. The selection is possible only when the shift bars are all at the neutral position and the fork-like portions are aligned. The shift bar having its fork-like portion engaged with shift finger 610 is shifted longitudinally when shift rod 61 is moved longitudinally to perform a change of gear ratio or speed.

The selection of engagement of shift finger 610 with the fork-like portions of the shift bars is performed by either moving shift lever 64 laterally by hand or operating third actuator A3 to move push rod 51, wherein third actuator A3 is operated by energizing either solenoid valves V3A or V3B to allow either the first or the second acting chamber to be connected to vacuum. Similarly, longitudinal movement of shift rod 61 is performed by either moving shift lever 64 forwards or backwards by hand or by operating second actuator A2, wherein second actuator A2 is operated by energizing either solenoid valves V2A or V2B, to allow either the first or the second acting chambers to be connected to vacuum.

Furthermore, second actuator A2 is provided with third, fourth and fifth detectors D3, D4 and D5 and each may be a micro-switch, to be activated by a recess 410 formed on push rod 41. Third, fourth and fifth detectors D3, D4 and D5 are each adapted to deliver an electrical, control signal to the control unit when shift rod 61 is at the front, neutral and rear positions, respectively. Similarly, third actuator A3 is provided with sixth, seventh and eighth detectors D6, D7, D8 and each may be a microswitch to be activated by a recess 510 formed on push rod 51, to deliver an electrical, control signal to the control unit when shift arm 63 is at its upper, neutral or lower positions or shift finger 610 is engaged with third shift bar L3, second shift bar L2 and first shift bar L1, respectively.

Second and third actuators A2, A3 are respectively provided with fourth and fifth actuators A4, A5 as shown in FIG. 4, fourth and fifth actuators respectively having push rods 71 and 68.

Push rod 51 is further provided with another recess 511 as shown in FIG. 4 to be engaged with push rod 68 of fifth actuator A5 when push rod 51 is at its neutral position or shift finger 610 is engaged with second shift bar L2. Fifth actuator A5 is of the single-acting type as shown in FIG. 7, having one acting chamber communicating with vacuum reservoir 10 by vacuum tube 69 provided with fifth solenoid valve V5. Similarly, push rod 41 is further provided with another recess 411 to be engaged with push rod 71 of fourth actuator A4 when push rod 41 is at its neutral position, fourth actuator A4 being of the single-acting type having one acting chamber communicating with the vacuum reservoir 10 by vacuum tube 78 provided with fourth solenoid valve V4.

FIG. 10 there is shown the construction of a single-acting actuator, taking fourth actuator A4 as an example. The construction of fifth actuator A5 is identical with fourth actuator A4. In the drawing, 72 and 73 are half casings; 74 is a diaphragm having push rod 71 fixedly connected thereof; 75 is the acting chamber communicating with vacuum reservoir 10, not shown, by vacuum tube 78 having fourth solenoid valve V4; 77 is a compression spring adapted to urge diaphragm 74 to restore it to its position when the vacuum in acting chamber 75 is released and 76 is a free chamber communicating with the atmosphere.

Referring back to FIG. 4, push rod 68 of fifth actuator A5 engages with recess 511 so as to prevent push rod 68 from moving when fifth solenoid valve V5 is not energized. Push rod 68 is pushed to disengage from recess 511 when fifth solenoid valve V5 is energized to operate fifth actuator A5, thus enabling third actuator A3 to operate. Similarly, fourth actuator A4 is adapted to prevent push rod 41 or second actuator A2 from moving when fourth solenoid valve V4 is not energized, and second actuator A2 is free to operate when fourth solenoid valve V4 is energized to operate fourth actuator A4.

Referring back to FIG. 1, trigger switch D11, which may be a micro switch, is disposed in abutment with accelerator pedal 90 so that trigger switch D11 is activated as soon as accelerator pedal 90 is depressed by the foot, even with a slight touch.

Also as shown in FIG. 1, accelerator pedal 90 is operatively connected to first bell crank 93 with spring 91, first bell crank 93 being operatively connected to throttle valve 92A of carburator 92 with first link 95, second bell crank 94 and second link 96. First bell crank 93 is provided with sixth actuator A6 having push rod 97 operatively connected therewith. Sixth actuator A6 is of single-acting type and is identical with fourth actuator A4 as shown in FIG. 10, having an acting chamber communicated with the vacuum reservoir by vacuum tube 98 provided with sixth solenoid valve V6. In this arrangement, sixth actuator A6 allows first bell crank 93 to be moved to open throttle valve 92A by pressing down accelerator pedal 90 when sixth solenoid valve V6 is not energized, but sixth actuator A6 pulls first bell crank 93 in the opposite direction to close throttle valve 92A as soon as sixth solenoid valve V6 is energized to operate sixth actuator A6.

Figure 12:
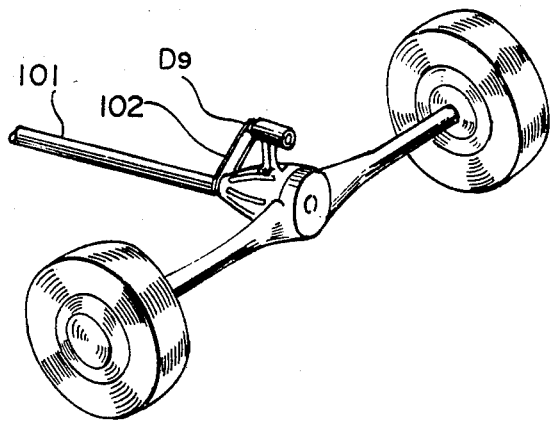
FIG. 12 is an oblique, perspective drawing showing the arrangement of the ninth detector for detecting the driving speed.

FIG. 12 shows the arrangement of ninth detector D9 for detecting the automobile road speed. Ninth detector D9 may be a conventional tachometer-generator or a pulse generator driven by propeller shaft 101 of the automobile with belt 102 so as to deliver a control signal to the control unit in response to the road speed of the automobile. Ninth detector D9 may also be operatively coupled to a speedometer drive shaft of the automobile.

Tenth detector D10 (FIG. 1) may be a pulse transmitter, electrically connected to the ignition circuit, not shown, of the automobile so as to deliver a control signal to the control unit in response to engine speed.

Control unit U as shown in FIG. 1 is adapted to process the control signals delivered from first through tenth detectors D1-D10, and trigger switch D11 to deliver relevant operation signals to first through sixth actuator A1-A6 according to a pre-determined sequence program. Control unit U is also provided with a control panel B having push-button switches respectively designated by R, N, H, L1, L2, M/A to deliver relevant control signals to control unit U when they are respectively pushed, in which the meaning for each designation is as follows:

R for reverse,
N for neutral,
H for high gear, forward,
L1 for first low gear forward,
L2 for second low gear forward, and
M/A for selection of mode, automatic or manual, in which R, N, H, L1 and L2 are each of single contact type, and M/A is a two-contact selection switch.

In FIG. 1, the signals delivered to and from the control unit U are each designated by the same designation of the respective detector or solenoid valve, e.g., D1 for the control signal delivered from first detector D1, and V1 for the operation signal delivered to first solenoid valve V1, etc.

Figure 14:
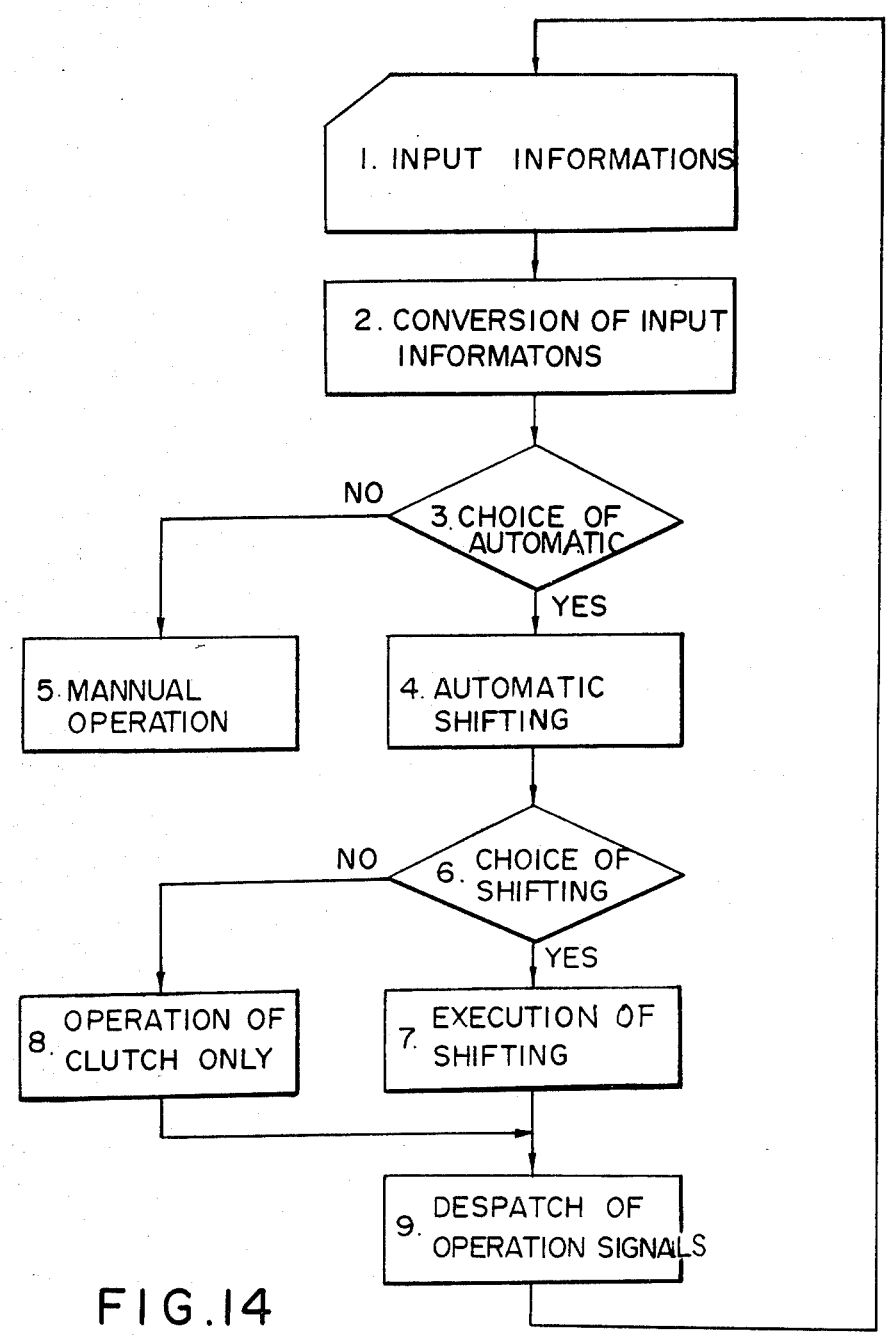
FIG. 14 is a flow chart of a program adapted to be incorporated into the control unit of the device of this invention.

The program employed in the embodiment of the device of this invention is outlined in a flow chart shown in FIG. 14. As shown in the drawing, the program comprises the following steps:

1. Receiving input information. The input information includes: road speed, engine speed, accelerator position, automatic or manual selection, forward or reverse, speed range selection (on forward), and clutch and transmission gear position.
2. Exchange and processing of input information.
3. Choice of automatic or manual.
4. Automatic shifting of the transmission, to be based upon the road speed, if the mode selection switch is selected at "automatic" and the trigger switch is on.
5. Manual shifting, if the mode selection switch is selected at "Manual".
6. Decision and selection of transmission gear.
7. Execution of shifting of the transmission.
8. Clutch operation only.
9. Output signal.

Figure 13:
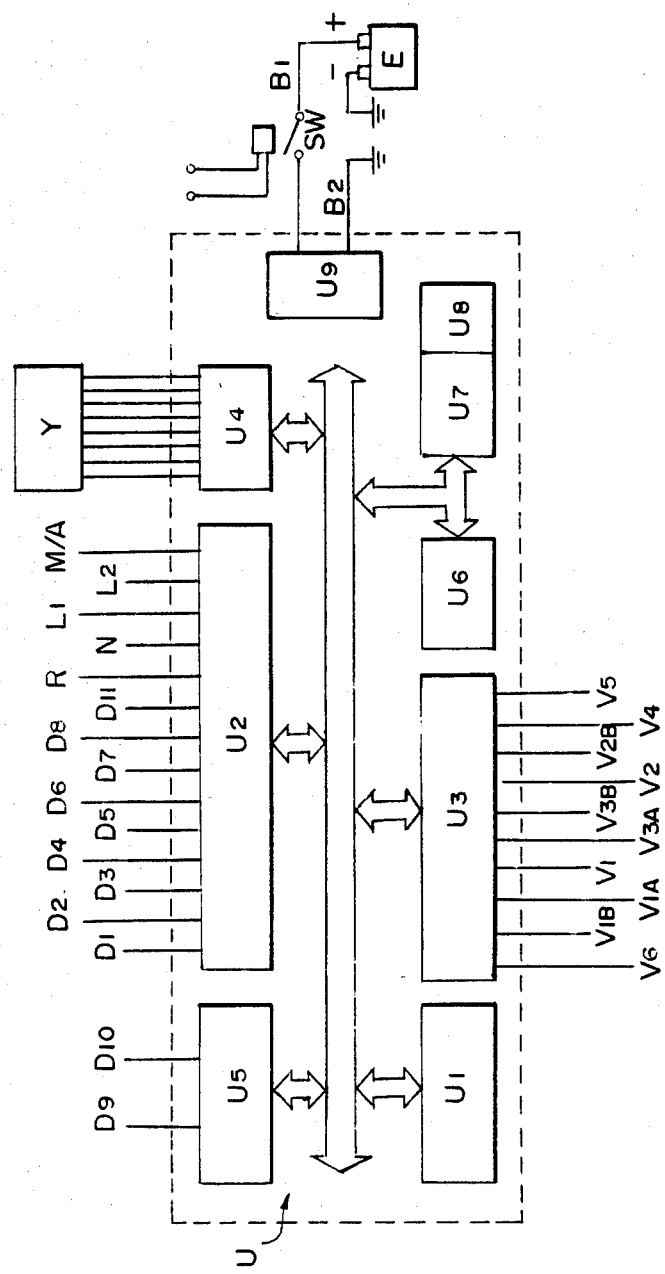
FIG. 13 is a block diagram showing the principal arrangement of the control unit of the device of this invention.

FIG. 13 shows a block diagram of the control unit of the device of this invention. In the drawing, the control unit is generally designated by U, which may be a Z-80 micro processor unit of Zilog Company, comprising:

a Z-80 CPU (control processing unit) generally designated by U1; three Z-80 PIO (periphery input output) U2, U3, U4; a 2K byte EPROM No. 2716 (erasable programmable read only memory, or simply ROM) U6; two 256 byte RAM No. 2114 (random access memory or simply RAM) U7, U8; and a power supply U9.

Ninth and tenth detectors D9, D10 are electrically connected to counter timer controller U5 so that the control signals representing engine speed and the automobile road speed are delivered to counter timer controller U5. First through eighth detectors D1-D8, trigger switch D11 and control switches R, N, L1, L2, A/M are electrically connected to periphery input output U2 so that the control signal representing clutch position, transmission gear position and accelerator position are delivered to periphery input output U2. Solenoid valves V1, V2A, V2B, V3B, V3A, V1A, VaB, V4 and V5 are electrically connected to periphery input output U3 so that relevant operation signals to these solenoid valves are delivered from periphery input output. Periphery input output U4 is electrically connected to a digital display Y so as to indicate numerically the automobile road speed. Control processing unit U1 is adapted to deliver execution orders according to the instructions delivered by ROM U6 or RAMS U7 and U8. ROM is provided with a program as outlined above, which will be descrived later. Power supply U9 is adapted to supply power to each component member of control unit U, the power being supplied by battery E on the automobile with power lines B1, B2, wherein power line B1 is provided with a relay switch SW electrically connected to the ignition switch, not shown, of the automobile so that control unit U is energized when the ignition switch is turned on, and de-energized when the ignition switch is turned off.

The program as outlined above is stored in ROM U6 to operate the device of this invention to perform the following functions when the ignition switch of the automobile is turned on and the control unit energized accordingly. It is to be understood that during the operation process the engine is running and the vacuum is maintained in vacuum reservoir 10 (FIG. 10), and mode selection switch M/A is in the "automatic" position.

1. While the engine is running (at idling speed), and when accelerator pedal 90 is released and thus trigger switch D11 is not activated (i.e., the trigger is open), control unit U delivers operation signals to disengage clutch C and to maintain clutch C disengaged.

2. As soon as accelerator pedal 90 is depressed (or touched) by the foot, trigger switch D11 is activated (closed) and a control signal is delivered to control unit U, which then:

(1) delivers an operation signal to and activates the sixth solenoid valve V6, so as to allow vacuum to be applied to sixth actuator A6 to pull bell crank 93 and prevent bell crank 93 from being moved by accelerator pedal 90. In this process, spring 91 stretches to offset the movement of accelerator pedal 90 so that throttle valve 92A will not move even though accelerator pedal 90 is depressed;

(2) checks transmission gear position, automobile road speed, selector switch position (H, L1, or L2), and delivers relevant operation signals to solenoid valves V2A, V2B, V4, V3A, V3B, V5 respectively to perform "shifting" of the transmission into an appropriate transmission gear position within the following prescribed speed range:

(A) if selector switch position H is selected:

| transmission gear position | driving speed range Km/hr |
|---|---|
| 1st gear | 0–10 |
| 2nd gear | 10–20 |
| 3rd gear | 20–40 |
| 4th gear | over 40 |

(B) if selector switch position L1 is selected:

| transmission gear position | driving speed range |
|---|---|
| 1st gear | 0–15 |
| 2nd gear | 15–30 |
| 3rd gear | 30–45 |
| 4th gear | over 45 |

(C) if selector switch position L2 is selected:

| transmission gear position | driving speed range |
|---|---|
| 1st gear | 0–20 |
| 2nd gear | 20–25 |
| 3rd gear | 35–50 |
| 4th gear | over 50 |

(D) if selector switch R is selected: transmission is "shifted" to "R"

(E) if selector switch N is selected: transmission is shifted to neutral position.

(3) if the transmission gear position is not in the appropriate position with respect to the prescribed road speed range, or direction, control unit U acts to deliver a series of operation signals to shift the transmission accordingly, the shifting operation being preceded by disengaging clutch C and followed by the engaging clutch C both by first actuator A1.

(4) As soon as the transmission is "shifted" to an appropriate gear position with respect to the automobile road speed, control unit U acts to de-energize solenoid valve V1 and in the meantime an operation signal is delivered to solenoid valve V1A so as slowly to break the vacuum in the first actuator A1 to allow clutch C to be engaged gently. In this process the automobile driving speed is checked, and if the driving speed is above a certain level, say over 50 Km/hr, another operation signal is delivered to solenoid valve V1B so as to break quickly the vacuum and quickly engage the clutch.

(5) As soon as the shifting of the transmission is completed and first solenoid valve V1 is de-energized to allow clutch C to be engaged, sixth solenoid valve V6 is de-energized to release sixth actuator A6 so that bell crank 93 may be operated by the accelerator pedal and thus the throttle valve of the carburator may be opened to accelerate the engine.

The driving speed ranges prescribed in the above operation (A), (B) and (C) can be conveniently changed depending on the horsepower capacity of the engine with respect to the pay load capacity of the automobile, as well as at the preference of the driver. The change of the aforesaid driving speed ranges can be done by replacing the program stored in ROM U6, which is an erasable programmable read only memory and is of great advantage for this purpose.

3. The above operation (A), (B) and (C) are performed while the automobile is moving forwards or at a stop, and operation (D) is performed only while the automobile is at a stop or moving backwards.

4. The clutch is disengaged when accelerator pedal 90 is released (trigger switch D11 is opened) and the automobile road speed falls down to the lower limit of the speed range of the transmission gear position at which the automobile is being driven.

The actual use and operation of the device of this invention will be described as follows, with reference to FIG. 1.

Firstly, the engine is started and the "automatic" position of mode selection switch M/A is selected and selector switch H is pushed. Secondly, the accelerator pedal 90 is depressed by the foot, thus causing trigger switch D11 to close; control unit U then acts to activate sixth actuator A6 so that throttle valve 92A of carburator 92 will not move until the gear shifting is completed and the engine will not accelerate immediately; in the meantime clutch C is disengaged, transmission T is "shifted" to first gear and then the clutch is gently engaged.

In this process the second, third, fourth and fifth solenoid valves and the second, third, fourth and fifth actuators operate in the following order:

Assuming the transmission is initially in neutral position:

1. fifth solenoid valve V5 is energized to actuate fifth actuator A5, allowing push rod 51 to move;

2. third A solenoid valve V3A is energized to actuate third actuator A3, causing shift arm 63 to move upwards thus causing shift rod 61 to rotate and shift finger to engage with first shaft bar L1;

3. fourth solenoid valve V4 is energized to actuate fourth actuator, allowing push rod 41 to move;

4. second B solenoid valve V2B is energized to actuate second actuator A2, causing shift rod 61 to move toward the fron end to shift the transmission into the first gear;

5. fourth and fifth solenoid valves V4, V5 are de-energized so as to cause push rods 71 and 68 to resiliently abut on push rods 41 and 51 respectively.

During the process of engaging clutch C, actuator A6 is released and throttle valve 92A of carburator 92 is allowed move and thus the engine is accelerated. As soon as the automobile road speed increases to over 10 Km/hr, control unit U acts to cause transmission T to shift from the first gear to the second gear. In this process:

1. fourth solenoid valve V4 is energized;

2. second B solenoid valve V2B is de-energized and second A solenoid valve V2A is energized simulteneously, so that shift rod 61, and first shift bar L1, are moved from the first gear to the second gear position without stopping at the neutral position; and then 3. fourth solenoid valve V4 is de-energized.

The shifting operation is preceded by a disengagement operation of clutch C and followed by an engagement operation of clutch C. As soon as clutch C is disengaged, sixth actuator A6 is activated to close the throttle valve so as to slow down the engine speed until clutch C is re-engaged. Sixth actuator A6 is then released to allow the throttle valve to be opened by depressed accelerator pedal 90.

As soon as the driving speed increases to over 20 Km/hr, transmission is shifted to the third gear in the similar manner as described above. In this process:

1. Second A solenoid valve V2A is de-energized and second B solenoid valve V2B is energized simultaneously so that shift rod 61 and first shift bar L1 are moved back from the second gear but are stopped at the neutral position as push rod 71, being urged by the spring in fourth actuator A4, engages with slot 411 to stop the movement of push rod 41;

2. third B solenoid valve V3B is energized and third A solenoid is de-energized simultaneously, so as to move shift arm 63 downwards, and shift finger 610 from shift bar L1 but to be stopped at second shift bar L2 as push rod 68, being urged by the spring in fifth actuator A5, engages with slot 511 to stop further movement of push rod 51; then 3. fourth solenoid valve V4 is energized to allow push rod 41 to move further, thus allowing shift rod 61, and second shift bar L2, to move to the third gear position.

The similar process is repeated as the automobile road speed continues to increase, until is reaches over 40 Km/hr, and transmission T is shifted to the fourth gear, accordingly.

When accelerator pedal 90 is released from being depressed, while at the fourth gear, for example, when one wants to slow the road speed, trigger switch D11 is caused to open, thus causing transmission T to remain at the fourth gear. When the driving speed slows to 40 Km/hr, which is the lower speed limit of the fourth speed, control unit U acts to cause clutch C to disengage and remain disengaged. This enables the automobile to further slow down as one applys the brake to the moving automobile.

When the driver wants to speed up the automobile after the automobile has slowed down to a certain speed, say 15 Km/hr, he can simple depress or touch accelerator pedal 90. Then trigger switch D11 is closed and control unit U acts to check the transmission gear position which is to fourth gear, with respect to the road speed which is 15 Km/hr, and thereby the shifting of transmission T accompanied with the acceleration of engine speed takes place, until transmission T is shifted to the second gear to which the road speed of 15 Km/hr belongs, and then clutch C is engaged and the throttle valve is moved to speed up the engine. A similar process is performed when the automobile is brought to a stop and is then moved again.

When the driver wants to back up the automobile from moving forwards, firstly, accelerator pedal 90 is released (and the brake is applied). Second, selector switch R is pushed by hand and accelerator pedal 90 is depressed. In the first step the automobile will be slowed down and clutch C will be disengaged automatically, and in the second step transmission T will be shifted to "reverse" as soon as the automobile comes to a complete stop, and then the automobile will be accelerated to move backwards.

When the driver wants to move the automobile forwards after backing it up, he can first release accelerator pedal 92 and apply the brake, and second push down selector switch H and depress accelerator pedal 92. The transmission will be automatically shifted from "reverse" to the first gear.

When the automobile comes to an up-slope at a certain speed, say in fourth gear, the transmission will be automatically shifted down to the 3rd gear as soon as the road speed falls below 40 Km/hr and the accelerator pedal is kept depressed to keep the trigger switch D11 closed. However, if the driver wants to maintain a driving speed of over 40 Km/hr while moving up the slope, he may push down selector switch L1 which enables the automobile to drive over 40 up to 45 Km/hr in third gear, provided that the horsepower capacity of the engine is sufficient for maintaining that driving speed on that slope. For steeper slopes selector switch L2 may be used.

Although a preferred embodiment employing a vacuum produced in the intake manifold of the engine of an automobile has been described and illustrated, however, it is to be understood that compressed air is equally applicable to the device of this invention with a re-arrangement of actuators. Furthermore, a pressurized fluid can be also be used in place of vacuum with a modification of actuators and with an addition of a return line from each actuator and each solenoid valve. It is to be further understood that other modifications and re-arrangement are possible by those having ordinary skill in the art, without departing from the principles and scope of this invention as defined in the appended claims.

What is claimed is:

1. An automatic gear shifting device for use in an automobile, comprising:

a transmission having gears assembled to be selectively shifted by a shift rod to transmit power from an engine to a drive axle of an automobile at a predetermined gear ratio and having a plurality of transmission gear positions each achieving a specific gear ratio, said shift rod having a longitudinal axis and being capable of moving longitudinally to perform the shifting of the gears and rotating with respect to the longitudinal axis to perform gear selection;

a clutch device operable with a release collar and capable of engaging to transmit and disengaging to interrupt power from the engine to said transmission;

detectors for detecting engine speed, automobile road speed, transmission gear position, clutch position, and for delivering electrical control signals responsive to engine speed, road speed, transmission gear position and clutch position;

a trigger switch operable by an accelerator pedal;

actuators operable by a working means for operating said shift rod of said transmission, engaging and disengaging of said clutch device, and opening and closing of a throttle valve of the automobile, said actuators comprising:

a first actuator operatively connected to said release collar;

a second actuator operatively connected to said shift rod to cause said shift rod to move longitudinally;

a third actuator operatively connected to said shift rod to cause said shift rod to rotate with respect to its longitudinal axis;

a fourth actuator for selectively preventing said shift rod from moving longitudinally;

a fifth actuator for selectively preventing said shift rod from rotating with respect to its longitudinal axis; and a sixth actuator operatively connected to the throttle valve;

valve means operable by electrical operation signals for admitting and interrupting said working means to said actuators; and a control unit adapted to receive said electrical control signals and produce electrical operation signals in response to said electrical control signals in accordance with a program to cause said valve means to operate so that the actuators and consequently the throttle valve, clutch device and transmission operate in association with each other to change the gear ratio to meet the driving speed and load condition of the automobile.

2. An automatic gear shifting device as recited in claim 1, wherein said working means is a vacuum produce in an intake passage of the engine of the automobile.

3. An automatic gear shifting device as recited in claim 1, wherein said working means is compressed air.

4. An automatic gear shifting device as recited in claim 1, wherein said working means is a pressurized fluid.

5. An automatic gear shifting device as recited in claim 1, wherein said first, second, third, fourth, fifth and sixth actuators each comprises:

two half casings joined together;

a flexible diaphragm disposed between said two half casings; and a push rod fixedly connected to said flexible diaphragm.

6. An automatic gear shift device as recited in claim 5, wherein said first actuator is provided with:

a restricting device for selectively restricting the movement of said push rod, said restricting device being operable by an operation signal delivered by said control unit; and a quick relieving device selectively to enable said push rod to move freely, said quick relieving device being operable by an operation signal delivered by said control unit.

7. An automatic gear shifting device as recited in claim 5, wherein said control unit for receiving said electrical control signals includes means responsive to said program, and said program comprises:

(a) a predetermined speed range for each transmission gear position, having an upper limit and a lower limit, (b) an operation sequence for operating the clutch device and transmission to be executed when said trigger switch is closed and when the automobile road speed is not within the predetermined speed range of the transmission gear position at which the automobile is being driven, including:

(1) closing the throttle valve;

(2) disengaging the clutch;

(3) shifting the transmission gear to the position to which the actual road speed belongs;

(4) engaging the clutch;

(5) operating the restriction device, or quick relieving device, depending upon the engine speed and road speed at the moment of engaging the clutch; and (c) an operation sequence for operating the clutch device when said trigger clutch is opened, including:

(1) disengaging the clutch when the road speed decreases to the lower limit of the speed range of the transmission position at which the automobile is being driven;

(2) engaging the clutch when the road speed increases from the lower limit of the speed range of the transmission position at which the automobile is being driven.

8. An automatic gear shifting device as recited in claim 7, wherein said control unit is provided with a speed range selector switch and said program further comprises a second predetermined speed range for each transmission position, said second predetermined speed range being applicable upon closing of said speed range selector switch.

9. An automatic gear shifting device as recited in claim 1, wherein said transmission is provided with a shift lever operatively connected to said shift rod, said clutch device is provided with a foot pedal capable of operating said release collar, and said control unit is provided with a mode selection switch for enabling said control unit to function when said switch is turned in one position and for enabling the transmission to be operated manually by said shift lever and the clutch device to be operated manually by said foot pedal when said switch is turned in another position.

* * * * *